US 6,554,481 B2

(12) United States Patent
Ito

(10) Patent No.: US 6,554,481 B2
(45) Date of Patent: *Apr. 29, 2003

(54) COMPRESSOR BEARINGS

(75) Inventor: Shigeru Ito, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/955,139

(22) Filed: Sep. 19, 2001

(65) Prior Publication Data

US 2002/0009248 A1 Jan. 24, 2002

Related U.S. Application Data

(62) Division of application No. 09/568,508, filed on May 11, 2000.

(30) Foreign Application Priority Data

May 12, 1999 (JP) ............................................. 11-131861

(51) Int. Cl.$^7$ ................................................. F01C 1/02
(52) U.S. Cl. ....................... 384/537; 384/560; 417/310; 418/55.1
(58) Field of Search ................................. 384/559, 560, 384/569, 584, 585, 564, 447, 537; 417/310; 418/55.1, 55.2, 55.3, 55.4, 55.5

(56) References Cited

U.S. PATENT DOCUMENTS

| | | | |
|---|---|---|---|
| 4,042,309 A | 8/1977 | Hiraga | |
| 4,353,607 A | * 10/1982 | Sturniolo | 384/559 X |
| 4,869,651 A | 9/1989 | Shimizu et al. | |
| 4,940,395 A | * 7/1990 | Yamamoto | 417/310 |
| 5,110,273 A | * 5/1992 | Nishida et al. | 418/55.6 |
| 5,286,117 A | * 2/1994 | Wojan et al. | 384/513 |
| 5,700,094 A | * 12/1997 | Dam et al. | 384/569 |
| 6,116,876 A | * 9/2000 | Kitano et al. | 418/55.2 |
| 6,179,591 B1 | * 1/2001 | Clendenin et al. | 418/55.1 |
| 6,273,616 B1 | * 8/2001 | Pflug | 384/564 |

* cited by examiner

Primary Examiner—David A. Bucci
Assistant Examiner—Colby Hansen
(74) Attorney, Agent, or Firm—Baker Botts L.L.P.

(57) ABSTRACT

A compressor bearing assembly for use in a compressor comprises an anti-friction rotation bearing and a compressor component. The anti-friction rotation bearing, has a first and second side. The compressor component has a bearing press fitting hole. The bearing press fitting hole has a mouth and a bottom and is formed in the compressor component and is adapted to receive a first side of a rotation bearing. The bearing press fitting hole has a first inner diameter at its mouth and a second inner diameter in the vicinity of its bottom. The first inner diameter is less than the second inner diameter. The structure for the compressor bearing in this invention may strongly and uniformly fixes the rotation bearing. Further, this structure prevents the rotation bearing from slanting within the pressing hole and prevents undesirable adherence between the rotation bearing and the press fitting hole. As a result, the durability of the rotation bearing and the shaft are improved.

8 Claims, 3 Drawing Sheets

FIG. 2.a

COMPRESSOR BEARINGS

The present application is a divisional application of U.S. patent application Ser. No. 09/568,508, filed May 11, 2000 entitled "Compressor Bearings," the disclosure of which is incorporated herein by reference in its entirety.

BACKGROUND OF THE INVENTION

1. Field of the Invention
2. Description of Related Art

Rotation bearings are used to facilitate rotation of components of the compressor. As shown in FIG. 3, a known rotation bearing 17 is mounted in the part having a bearing press fitting hole 191. Bearing press fitting hole 191 that retains and mounts rotation bearing 17 generally may be press fitted into by the rotation bearing 17 from one side (from right side in the figure). Bearing press fitting hole 191 may have an open side to receive rotation bearing 17 and a closed side. Therefore, rotation bearing 17 may be stopped at its closed side in the bearing press fitting hole 191.

As shown in FIG. 3, bearing press fitting hole 191 has smooth sidewalls and a substantially rectangular, cross-sectional shape, and its inner diameter a3 is symmetric in its cross-sectional view. Inner diameter a3 is generally designed to be slightly smaller than outer diameter c3 of rotation bearing 17. If rotation bearing 17 is pressed into bearing press fitting hole 191, it may be pressed into only one side of hole 191. The inner side of hole 191 is open. Because the open side of hole 191 is less rigid than the closed side of hole 191, the open side is more flexible than the closed inner side of hole 191. Therefore, rotation bearing 17 occasionally can not be fixed securely into one side of hole 191, and as a result, rotation bearing 17 twists with respect to the axis of hole 191 and lodge at an angle with respect to the drive shaft of the compressor in hole 191. Consequently, only a portion of rotation bearing 17 is supported by hole 191, and the durability of rotation baring 17 and the shaft is reduced.

SUMMARY OF THE INVENTION

It is an object of the present invention to provide a securing structure for a compressor bearing, which improves the durability of the rotation bearing and the drive shaft.

In an embodiment of the invention, a compressor bearing assembly for use in a compressor, such as a scroll compressor, a slant plate compressor, or the like, comprises an anti-friction rotation bearing and a compressor component. The anti-friction rotation bearing has a first and a second side. The compressor component has a bearing press fitting hole formed therein and is adapted to receive the first side of the rotation bearing. For example, the compressor component may be a compressor housing. The bearing press fitting hole has a first inner diameter, generally at its mouth, and a second inner diameter, generally at its bottom, such that the first inner diameter is less than the second inner diameter.

In another embodiment, a compressor bearing assembly for use in a compressor, such as a scroll compressor, a slant plate compressor, or the like, comprises an anti-friction rotation bearing and a compressor component. The anti-friction rotation bearing has a first and a second side. The compressor component has a bearing press fitting opening formed therein. The opening has an open end and a closed bottom surface and is adapted to receive a first side of the rotation bearing. The bearing press fitting opening has a first inner diameter, generally at its mouth, and a second inner diameter, generally at its bottom. The first inner diameter is less than said second inner diameter.

In still another embodiment, a compressor bearing assembly for use in a compressor, such as a scroll compressor, a slant plate compressor, or the like, comprises an anti-friction rotation bearing and a compressor component. The anti-friction rotation bearing has a first and a second side. The compressor component has a bearing press fitting hole formed therein and is adapted to receive a first side of the rotation bearing. The bearing press fitting hole has a hole sidewall with a first inner diameter, generally at its mouth, and a second inner diameter, generally at its bottom, such that the first inner diameter is less than the second inner diameter. The sidewall is deformable, such that the first inner diameter is substantially equal to the second inner diameter when the rotation bearing is fixedly pressed into the hole.

In yet another embodiment, a compressor bearing assembly for use in a compressor, such as a scroll compressor, a slant plate compressor, or the like, comprises an anti-friction rotation bearing and a compressor component. The anti-friction rotation bearing has a first and a second side. The compressor component has a bearing press fitting opening formed therein. The opening has an open end, a closed bottom surface, and a opening sidewall and is adapted to receive a first side of the rotation bearing. The opening sidewall has a first inner diameter, generally at its mouth, and a second inner diameter, generally at its bottom. The first inner diameter is less than said second inner diameter. The sidewall is deformable, such that the first inner diameter becomes substantially equal to said second inner diameter when the rotation bearing is fixedly pressed into the opening.

The structure for the compressor bearing in this invention may strongly and uniformly fix the rotation bearing. Further, this structure prevents the rotation bearing from slanting and prevents undesirable adherence between the rotation bearing and the press fitting hole. As a result, the durability of the rotation bearing and the shaft are improved.

Further objects, features, and advantages of this invention will be understood from the following detailed description of preferred embodiments when read in conjunction with the accompanying drawings.

BRIEF DESCRIPTION OF THE DRAWINGS

Reference now is made to the following description taken in conjunction with the accompanying drawings, in which like reference numerals represent like referenced parts, wherein:

FIGS. 2a and 2b depict parts of the scroll-type compressor of FIG. 1, in which FIG. 2a is a longitudinal, cross-sectional view of a rotating part of front housing and FIG. 2b is a longitudinal, cross-sectional view of the rotation part of the orbiting scroll.

DETAILED DESCRIPTION OF PREFERRED EMBODIMENTS

Figure 1:
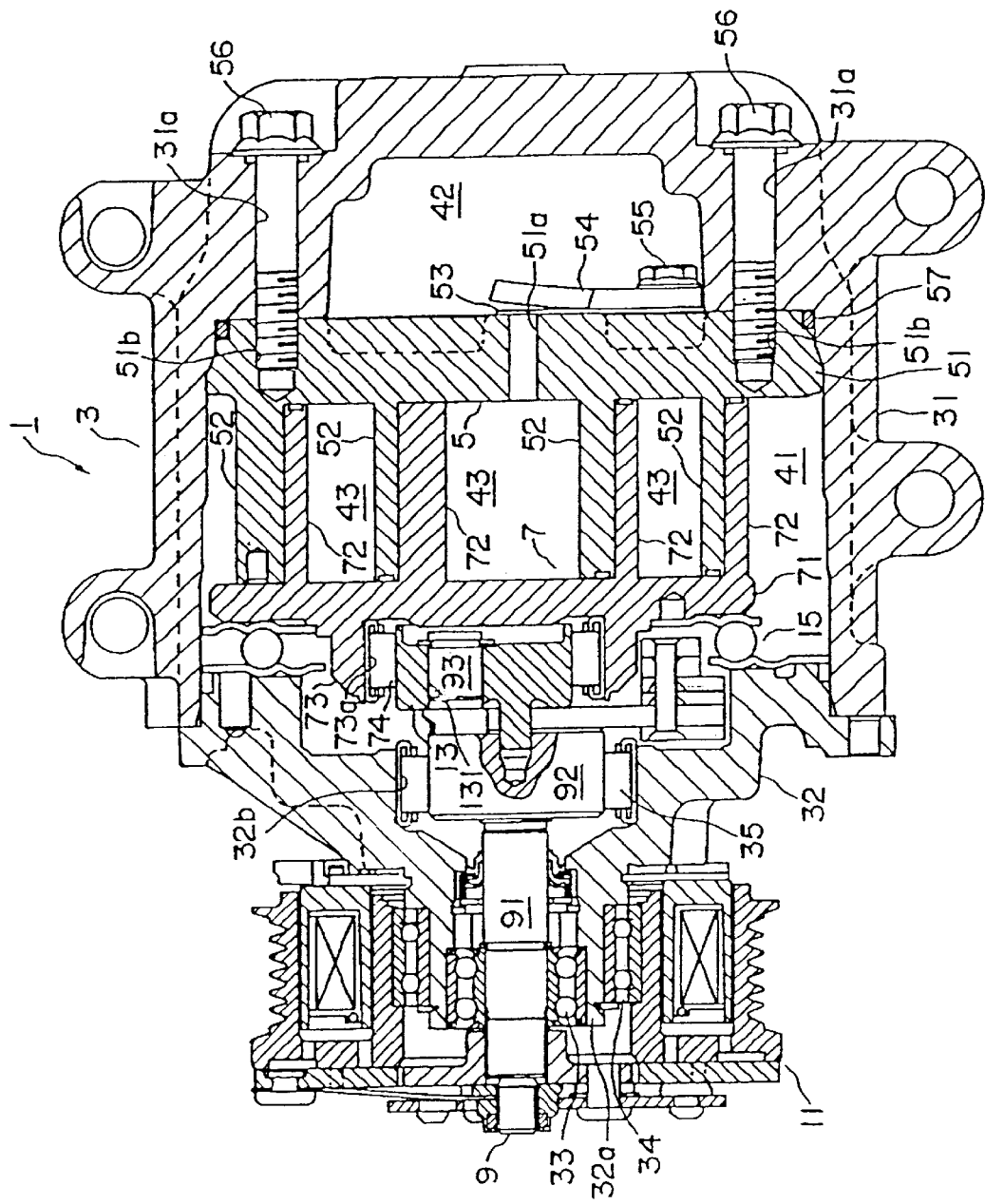
FIG. 1 is a longitudinal cross-sectional view of an embodiment of a scroll-type compressor in accordance with a preferred embodiment.

Referring to FIGS. 1 and 2a, a scroll-type compressor unit 1 includes housing 3 and fixed scroll 5 and drive shaft 9. Housing 3 is formed of cup-shaped casing 31 and front housing 32. Cup-shaped casing 31 is cup-shaped, and one side of cup-shaped casing 31 is open. Penetrating holes 31a are formed in the bottom of cup-shaped casing 31. Front housing 32 is funnel-shaped and is fixed to the open side of cup-shaped casing 31, so that front housing 32 covers and closes the open side of cup-shaped casing 31. Front housing 32 has cylinder-shaped boss 32a, and anti-friction rotation bearing 33 is located within boss 32a. Electromagnetic clutch 11 is attached to the outside of boss 32a through ball bearing 34.

Central part of front housing 32 on the left side (seen in the figure) of orbiting scroll 7 has bearing press fitting hole 32b, and shell-type needle bearing 35 is pressedly fitted into bearing press fitting hole 32b. One side of bearing press fitting hole 32b (the side toward orbiting scroll 7) is open, and the other side is closed. The open side of bearing press fitting hole 32b communicates with boss 32a. Therefore, shell-type needle bearing 35 is pressed into the open side of bearing press fitting hole 32b. As shown in FIG. 2a, the interior sidewall of bearing press fitting hole 32b may be tapered, and first inner diameter a1 of the open side of bearing press fitting hole 32b is smaller than second inner diameter b1 of the inner end of hole 32b. The numerical value of the differential between a1 and b1, i.e., (b1−a1), may be less than about 10 μm. However, this differential value is dependent on the rigidity of hole 32b. Specifically, if the rigidity of hole 32b decreases, the value for the differential increases and may exceed about 10 μm. The relationship between the first inner diameter a1 of and the second inner diameter b1 of hole 32b is essential to understanding the operation of the embodiments of the invention. Generally, diameter b1 is greater than diameter a1, and the outer diameter c1 of shell-type needle bearing 35 may either be greater than diameter b1 (c1>b1), less than diameter b1 (c1<b1), or equal to the diameter b1 (c1=b1). In a preferred embodiment, diameter b1 is less than diameter c1 (b1<c1). Consequently, the collar of hole 32b is in contact with needle bearing 35 over a wide area and fits very snugly into hole 32b. Similarly, if diameter b1 is equal to diameter c1, the collar of hole 32b is in contact with needle bearing 35 over a wide area and bearing 35 fits snugly into hole 32b, especially at diameter a1, i.e., at the mouth of hole 32b. If diameter b1 is greater than diameter c1, the collar of hole 32b is in contact with needle bearing 35 over a narrower area, and bearing 35 fits into hole 32b especially at diameter a1, i.e., at the mouth of hole 32b.

Fixed scroll member 5 includes first end plate 51 and first spiral element 52. First spiral element 52 has an involute curve of a circle and is formed on the surface of first end plate 51. First end plate 51 is disk-shaped, and discharge port 51a is formed in the central part of first end plate 51. Receiving bolt holes 51b are threaded in the end part of the end plate 51. Discharge port 51a is used to discharge the refrigerant gas, which is compressed in fluid pocket 43, to discharge chamber 42. Reed valve 53 and valve retainer 54 are fixedly secured to first end plate 51 by bolt 55. Valve retainer 54 limits the lift amounts of reed valve 53.

Fixed scroll member 5 is fixedly secured to inner surface of cup-shaped casing 31 by a plurality of bolts 56 which are screwed into corresponding receiving bolt holes 51b through corresponding penetrating holes 31a in cup-shaped casing 31. In this condition, the surface of the outer circle of first end plate 51 is secured to the surface of the inner circle of cup-shaped casing 31. Sealing member 57 is disposed between the surface of the outer circumference of first end plate 51 and the surface of the inner circumference of cup-shaped casing 31. Consequently, first end plate 51 isolates two chambers in housing 3, and a first chamber is positioned to the left side (seen in figure) of end plate 51, and is called suction chamber 41. First spiral element 52 of fixed scroll member 5 and second spiral element 72 of orbiting scroll member are enclosed in suction chamber 41. The second chamber, which is positioned on the right side of end plate 51 and is defined by the bottom of the inner surface of cup-shaped casing 31, is discharge chamber 42.

Figure 2B:
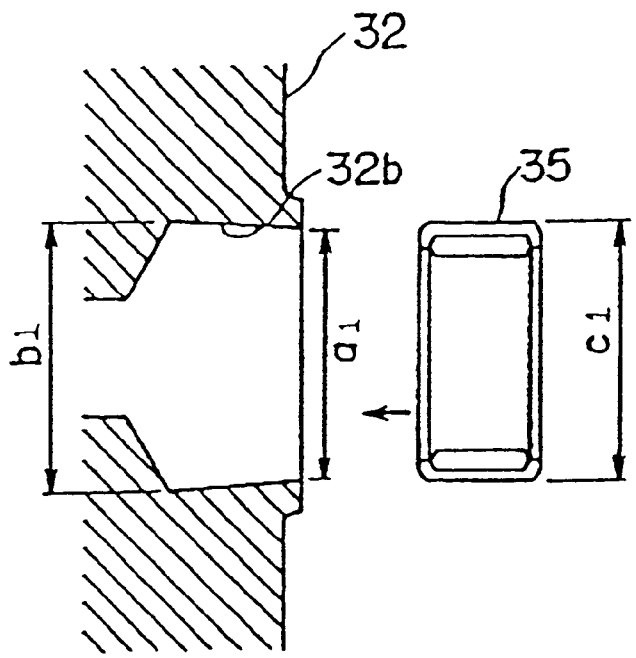
Figure 2B:
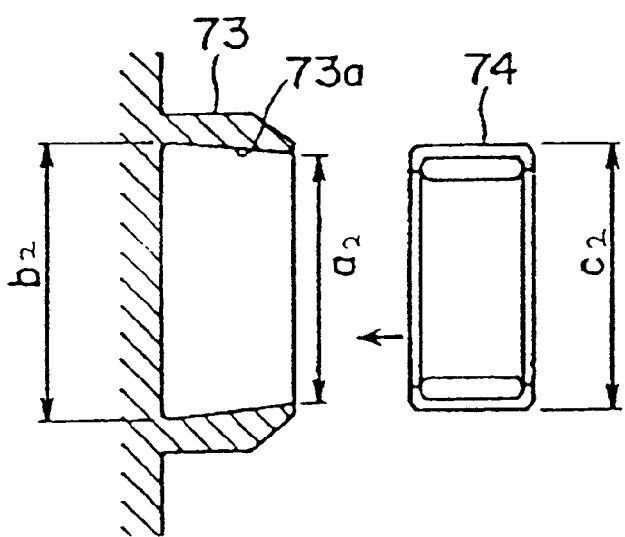
Figure 3:
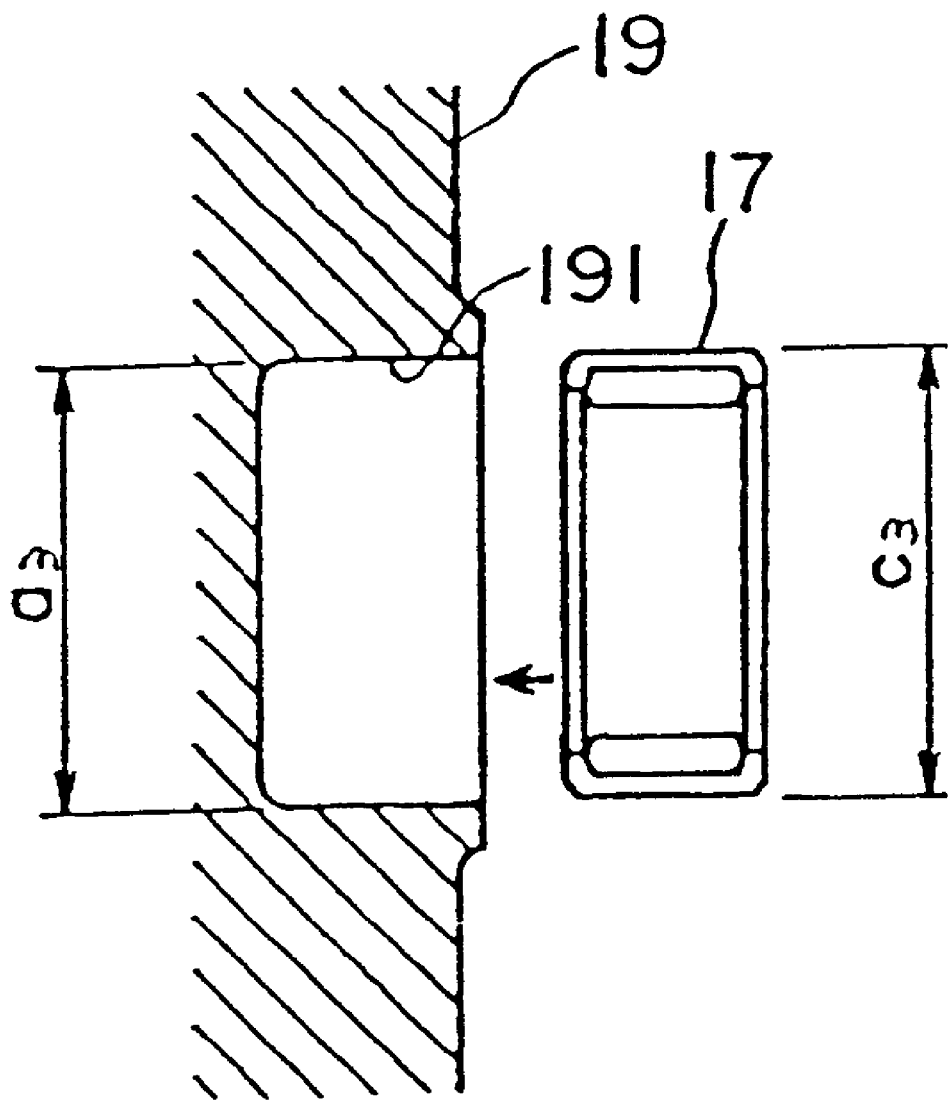
FIG. 3 is a longitudinal cross-sectional view of a conventional rotating part.

Orbiting scroll member 7 includes second end plate 71, which is disk-shaped; second spiral element 72; and boss 73. Each of first spiral element 52 and second spiral element 72 has the involute curve of a circle and is formed on the surface of first end plate 51 and on the surface of second end plate 71, respectively. Boss 73 is cylinder-shaped and formed on the left surface of second end plate 71. Boss 73 has bearing press fitting opening 73a. Bearing press fitting opening 73a has a corresponding shape to the above described bearing press fitting hole 32b of front housing 32. Shell-type needle bearing 74 is pressed into bearing press fitting opening 73a. One side of opening 73a of boss 73 is open, and the other side is closed. Therefore, shell-type needle bearing 74 is pressed into the open side of bearing press fitting opening 73a. As shown in FIG. 2b, inner surface of bearing press fitting opening 73a is tapered, and the inner diameter a2 of bearing press fitting opening 73a at its mouth is smaller than the bottom inner diameter b2. The numerical value of the differential between a2 and b2, i.e., (b2−a2), may be less than about 10 μm. However, this differential value is dependent on the rigidity of opening 73a. Specifically, if the rigidity of opening 73a decreases, the value for the differential increases and may exceed about 10 μm. The relationship between the first inner diameter a2 at the mouth and the second inner diameter b2 at the bottom of opening 73a is essential to understanding the operation of the embodiments of the invention. Generally, diameter b2 is greater than diameter a2, and the outer diameter c2 of shell-type needle bearing 74 may either be greater than diameter b2 (c2>b2), less than diameter b2 (c2<b2), or equal to the diameter b2 (c2=b2). In a preferred embodiment, diameter b2 is less than diameter c2 (b2<c2). Consequently, the collar of hole 73a is in contact with needle bearing 74 over a wide area and fits very snugly into opening 73a. Similarly, if diameter b2 is equal to diameter c2, the collar of opening 73a is in contact with needle bearing 74 over a wide area and bearing 74 fits snugly into opening 73a, especially at diameter a2, i.e., at the mouth of opening 73a. If diameter b2 is greater than diameter c2, the collar of opening is in contact with needle bearing 74 over a narrower area, and bearing 74 fits into opening 73a, especially at diameter a2, i.e., at the mouth of opening 73a.

First spiral element 52 of fixed scroll member 5 and second spiral element 72 of orbiting scroll member 7 are interfitted at an angular offset of 180° and a radial offset to make a plurality of line contracts between the spiral elements. The plurality of line contracts define at least one pair of fluid pockets 43 between first spiral element 52 and second spiral element 72.

A rotation preventing mechanism 15 is provided between a surface of orbiting scroll member 7 and the inner surface of front housing 32. Rotation preventing mechanism 15 prevents the rotation of orbiting scroll member 7 with respect to fixed scroll member 5, when orbiting scroll member 7 moves in an orbital motion at a predetermined orbital radius with respect to the center of fixed scroll member 5.

A drive shaft 9 comprises a small diameter shaft portion 91, disk rotor portion 92 connected coaxially to one end of small diameter shaft portion 91, and crank pin 93 connected eccentrically to one surface of disk rotor portion 92 from the center of disk rotor portion 92. Small diameter shaft 91 of drive shaft 9 is rotatably supported in boss 32a of front housing 32 by anti-friction rotation bearing 33. Disk rotor portion 92 of drive shaft 9 is rotatably supported in the orbiting scroll member 7 side portion of front housing 32 by shell-typed needle bearing 35. The tip portion of small diameter shaft portion 91 of drive shaft 9 projects from front housing 32. The projecting tip portion is connected to electromagnetic clutch 11. Crank pin 93 is inserted into eccentric hole 131 of eccentric bush 13, which is rotatably disposed in boss 73 of orbiting scroll member 7. By such a structure, drive shaft 9 is connected to orbiting scroll member 7. When a drive force is transmitted from an external drive source, eg., an engine of a vehicle, via electromagnetic clutch I1, drive shaft 9 is rotated, and orbiting scroll member 7 is driven in an orbital motion by the rotation of drive shaft 9. Rotation preventing mechanism 15 prevents the rotation of orbiting scroll member 7 with respect to fixed scroll member 5. When orbiting scroll member 7 moves in an orbital motion, the fluid pockets 43, which are defined between scroll member 5 and scroll member 7, move to the center with a consequent reduction in volume. Finally, fluid pockets 43 move to discharge port 51a. The compressed fluid in the fluid pockets 43 is discharged into discharge chamber 42.

The inner sidewall of the bearing press fitting opening, which is step-shaped in a cross-sectional view, may operate in the same manner as the tapered inner sidewall of the bearing press fitting hole.

Thus, securing structures for compressor bearings are described in the foregoing embodiments with respect to a scroll-type compressor, but they may be applicable to other types of compressors, e.g., a swash plate-type compressor.

The securing structure for the compressor bearing in this invention may strongly and uniformly fixes the rotation bearing. Further, this structure prevents the rotation bearing from slanting within the press fitting hole or within the press fitting opening and prevents undesirable adherence between the rotation bearing and the press fitting hole. As a result, the durability of the rotation bearing and the shaft are improved.

This invention has been described in connection with preferred embodiments. These embodiments, however, are merely exemplary, and the invention is not restricted thereto. It will be readily understood by those skilled in the art that variations may be made within the scope of this invention, as defined by the following claims.

What is claimed is:

1. A compressor bearing assembly for use in a compressor, comprising:
    an anti-friction rotation bearing having a first and a second side; and
    a compressor component having a bearing press fitting hole, having a mouth and a bottom, formed therein and adapted to receive a first side of said rotation bearing, wherein said bearing press fitting hole has a first inner diameter at said mouth and a second inner diameter at about said bottom, such that said first inner diameter is less than said second inner diameter.

2. The compressor bearing of claim 1, wherein said compressor component is a front housing.

3. The compressor bearing of claim 1, wherein a drive shaft passes through said bearing press fitting hole and is rotatably supported by said rotation bearing.

4. The compressor bearing of claim 1, wherein said bearing press fitting hole has a sidewall that is continuous and tapered from said first inner diameter to said second inner diameter.

5. The compressor bearing of claim 1, wherein said bearing press fitting hole has a sidewall extending from said first inner diameter to said second inner diameter and a step is formed in said sidewall between said first inner diameter and said second inner diameter.

6. The compressor bearing of claim 1, wherein said rotation bearing is a shell-type needle bearing.

7. The compressor bearing of claim 1, wherein said compressor is a scroll compressor.

8. A compressor bearing assembly for use in a compressor, comprising:
    an anti-friction rotation bearing having a first and a second side; and
    a compressor component having a bearing press fitting hole, having a mouth and a bottom, formed therein and adapted to receive a first side of said rotation bearing, wherein said bearing press fitting hole has a hole sidewall with a first inner diameter at said mouth and a second inner diameter at about said bottom, such that said first inner diameter is less than said second inner diameter, and wherein said sidewall is deformable, such that said first inner diameter becomes substantially equal to said second inner diameter when said rotation bearing is fixedly pressed into said hole.

* * * * *